(12) United States Patent
Steege et al.

(10) Patent No.: US 7,806,470 B2
(45) Date of Patent: Oct. 5, 2010

(54) VEHICLE COMMAND ARMREST ASSEMBLY

(75) Inventors: Scott Charles Steege, Denver, IA (US); Shawn Michael Bartz, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/274,888

(22) Filed: Nov. 20, 2008

(65) Prior Publication Data

US 2010/0123345 A1 May 20, 2010

(51) Int. Cl.
A47C 7/62 (2006.01)
B60N 2/46 (2006.01)

(52) U.S. Cl. ............................ 297/188.17; 297/188.19; 297/411.26; 297/411.46

(58) Field of Classification Search ................................ 297/188.14–188.16, 411.2, 217.3, 411.35, 297/411.37, 188.19, 411.26, 440.16; 296/65.04; 180/329, 318, 89.12
See application file for complete search history.

(56) References Cited

U.S. PATENT DOCUMENTS

| | | | | |
|---|---|---|---|---|
| 4,351,562 A | * | 9/1982 | Twitchell et al. ........ | 297/344.17 |
| 4,730,691 A | * | 3/1988 | Grigg ......................... | 180/329 |
| 5,076,524 A | * | 12/1991 | Reh et al. ................. | 248/296.1 |
| 5,311,302 A | | 5/1994 | Berry et al. | |
| 5,335,142 A | * | 8/1994 | Anderson ............... | 361/679.07 |
| 5,409,079 A | * | 4/1995 | Strong et al. .............. | 180/326 |
| 5,860,488 A | * | 1/1999 | Kim ........................... | 180/271 |
| 6,039,141 A | | 3/2000 | Denny | |
| 6,059,366 A | * | 5/2000 | Hu .......................... | 297/411.35 |
| 6,089,663 A | * | 7/2000 | Hill .......................... | 297/258.1 |
| 6,502,904 B1 | * | 1/2003 | Hansen .................. | 297/411.35 |
| 6,715,269 B2 | * | 4/2004 | Nanlawala et al. ....... | 56/10.2 R |
| 6,814,174 B2 | * | 11/2004 | Fluent et al. ............... | 180/329 |
| 6,908,158 B2 | * | 6/2005 | Willette et al. ......... | 297/411.37 |
| 7,121,608 B2 | * | 10/2006 | Billger et al. ............ | 296/65.06 |
| 2004/0133322 A1 | | 7/2004 | Chernoff et al. | |
| 2006/0042857 A1 | | 3/2006 | Catton et al. | |

FOREIGN PATENT DOCUMENTS

DE 102005023890 12/2005

OTHER PUBLICATIONS

European Search Report, 5 Pages, Feb. 24, 2010.

* cited by examiner

*Primary Examiner*—David Dunn
*Assistant Examiner*—Erika Garrett

(57) ABSTRACT

An armrest assembly includes an armrest base unit. The base unit has a side portion forming a channel member. First and second auxiliary units may be mounted to the base unit. Each auxiliary unit has an attachment member which is received by and mates with the channel member. A slot and bores are formed in a bottom surface of the channel member. Screws extend through the slot and bores and are screwed into the auxiliary units. The attachment and channel members have mating U-shaped cross-sectional shapes.

5 Claims, 5 Drawing Sheets

VEHICLE COMMAND ARMREST ASSEMBLY

FIELD OF THE INVENTION

The present invention relates to a vehicle command armrest assembly.

BACKGROUND OF THE INVENTION

Current production tractors have an armrest which includes a plurality control devices, such as levers switches and knobs which are used to control various functions on or coupled to the tractor. It is known to couple a joystick control unit to such a command arm for controlling functions of a loader. In a current production tractor, a joystick control unit is mounted to the front of the command arm by several screws. The process to install the joystick is quite time consuming because the command arm needs to be disassembled, holes drilled, and then components reassembled. The disassembly creates the opportunity for parts to be damaged and or misplaced. Because of the difficulty in assembly of the joystick control to the command arm, the joystick control stays attached all the time, regardless if a loader is being used or not. This can become a nuisance for the operator and block some visibility over the front of the command arm. It is desired to have a command arm interface assembly which simplifies the coupling and uncoupling of a joystick and other components to the command arm.

The joystick control is also not positioned in an ergonomic friendly position. For most operators, their elbow is positioned over a hole or other switches on the command arm top, when they are operating the joystick control. This does not provide support for the elbow and becomes fatiguing after a short period of use.

SUMMARY OF THE INVENTION

Accordingly, an object of this invention is to provide an armrest command arm assembly to which auxiliary units can be quickly and easily attached, removed and adjusted.

This and other objects are achieved by the present invention, wherein an armrest assembly includes an armrest base unit. The base unit has a side portion forming a channel member. First and second auxiliary units may be mounted to the base unit. Each auxiliary unit has an attachment member which is received by and mates with the channel member. A slot and bores are formed in a bottom surface of the channel member. Fastener screws extend through the slot and bores and are screwed into the auxiliary units. The attachment and channel members have mating U-shaped cross-sectional shapes.

DESCRIPTION OF THE PREFERRED EMBODIMENT

Figure 1:
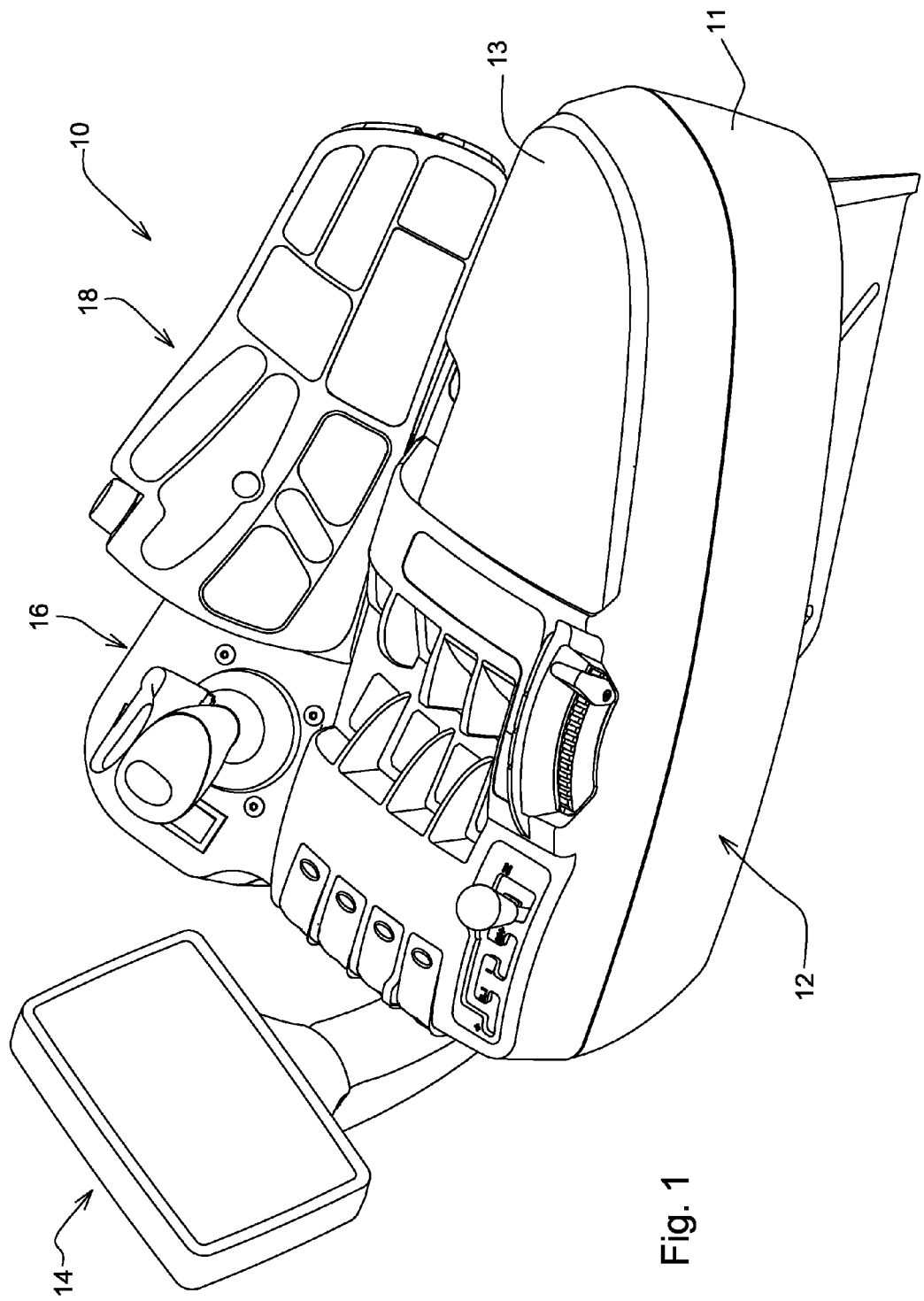
FIG. 1 is an upper perspective view of a command arm assembly embodying the invention.
Figure 2:
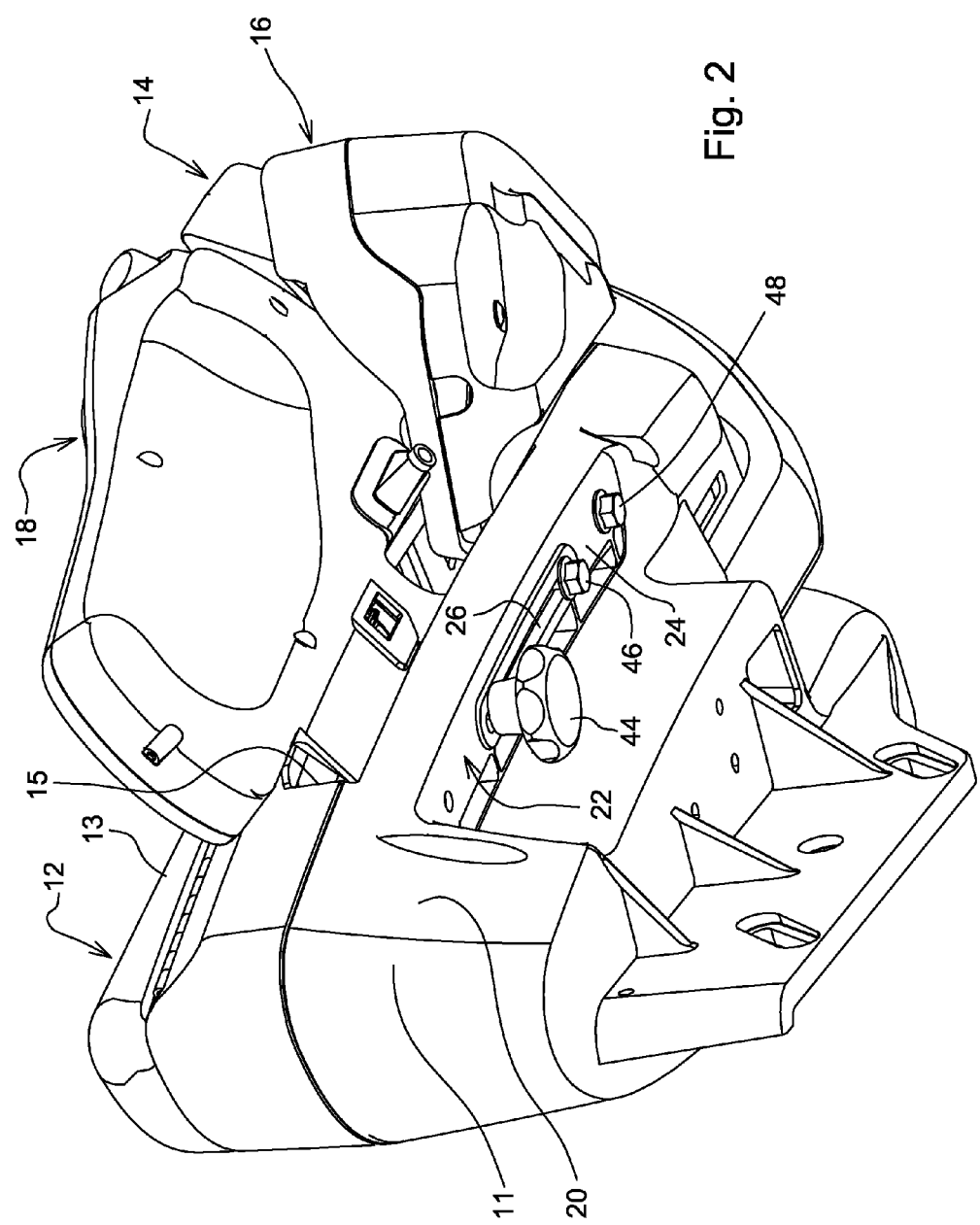
FIG. 2 is a lower perspective view of the command arm assembly of FIG. 1.
Figure 4:
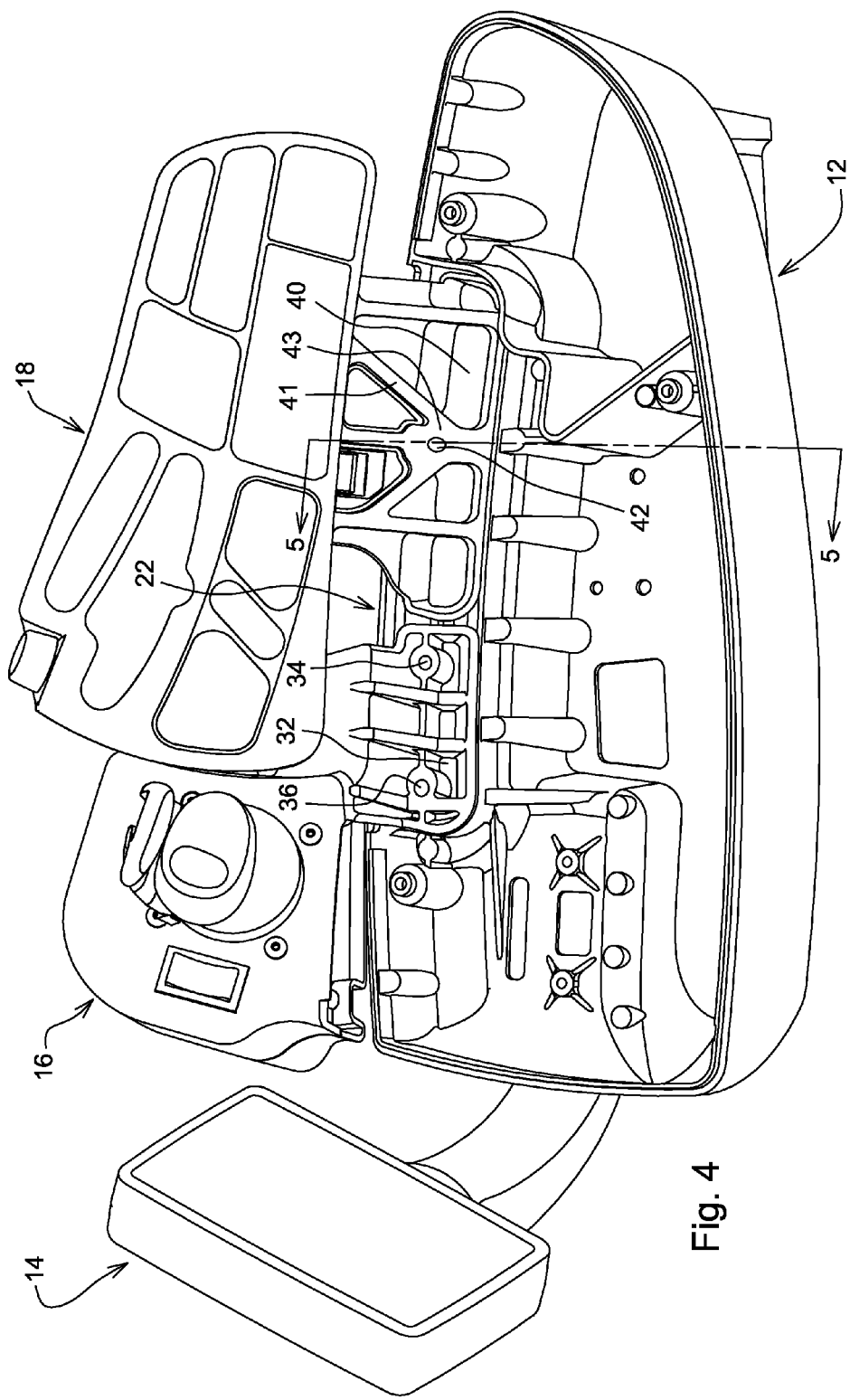
FIG. 4 is an upper perspective view of the base armrest unit of FIG. 1 with its upper panel removed and showing auxiliary units mounted thereto.

Referring to FIGS. 1, 2 and 4, a vehicle command arm assembly 10 includes a base command arm or armrest unit 12. As is well known, the base armrest unit 12 is preferably part of a vehicle seat assembly so that unit 12 pivots and moves with the seat (not shown). Coupled to the base unit 12 is a touchpad/display unit 14, a joystick unit 16 and a command system module (CMS) 18. Other types of auxiliary units or modules could be attached to the base unit 12.

Figure 3:
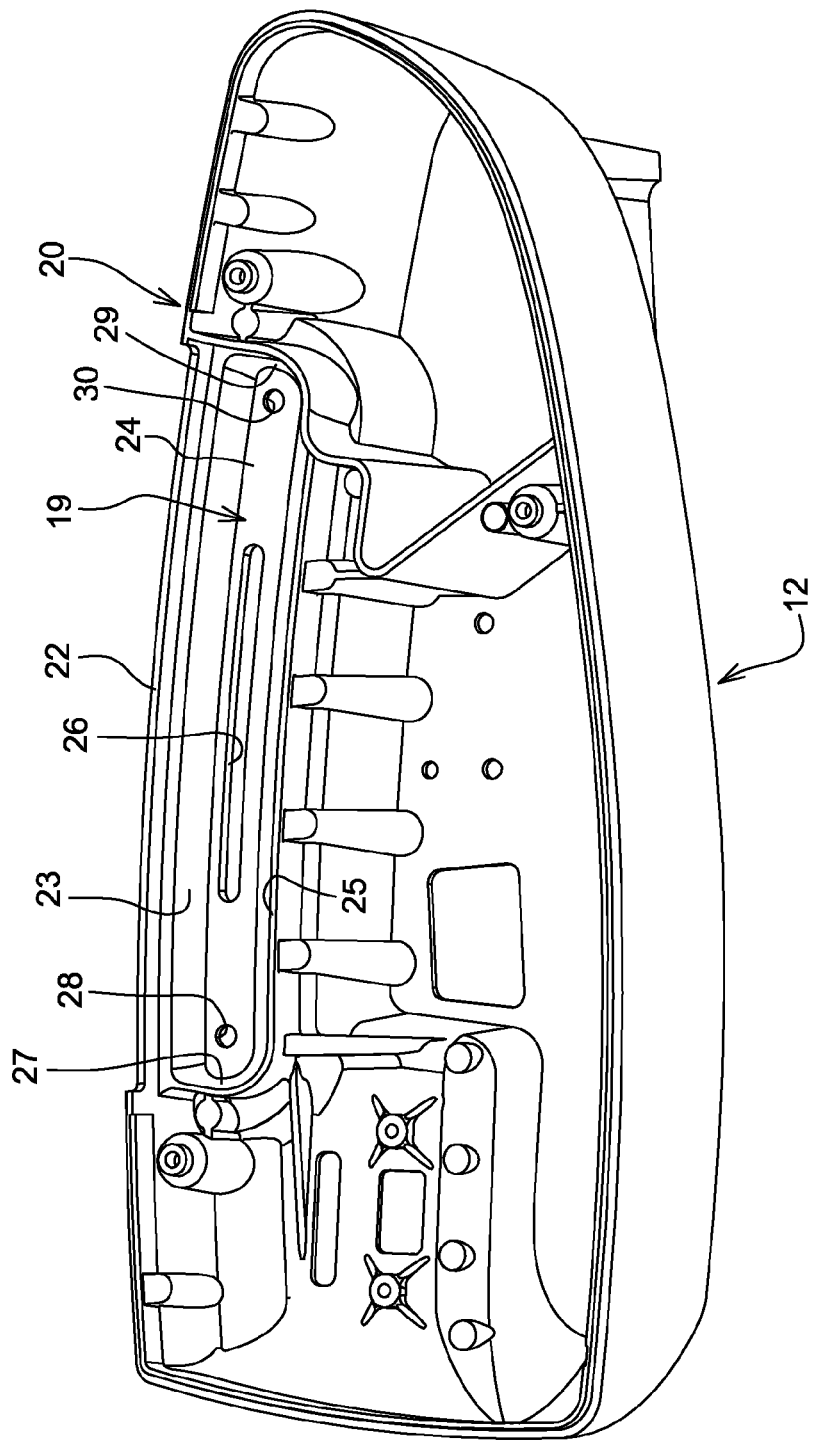
FIG. 3 is an upper perspective view of the base armrest unit of FIG. 1 with its upper panel removed.

As best seen in FIGS. 2 and 3, the base unit 12 includes a tub 11 and a top cover 13. The tub 11 and cover 13 form an opening 15 in a side 20 thereof. The side 20 of the tub 11 includes a channel member 22 which forms an upwardly opening channel 19 with a bottom surface 24 and sloping side walls 23 and 25. The bottom surface 24 includes an elongated slot 26 and a pair of bores 28 and 30 formed therein. The channel 22 is closed at both ends by end walls 27 and 29.

Referring now to FIG. 4, joystick unit 16 includes an attachment member or support 32 which is removably received by an end of the channel member 22. A pair of threaded bores 34 and 36 are formed in a bottom surface of attachment member 32. Command system module 18 includes an attachment member 40 which is removably and slidably received by the channel member 22. Attachment member 40 includes a plurality of reinforcing ribs 41 which join together at a center portion 43. A threaded bore 42 is formed in the center portion 43 of attachment member 40.

As best seen in FIG. 2, a knob 44 includes a threaded shaft (45 in FIG. 5) which extends through the slot 26 and is screwed into the threaded bore 42. Bolt 46 is extends through the slot 26 and is screwed into threaded bore 34. Bolt 48 extends through the bore 28 and is screwed into threaded bore 36.

Figure 5:
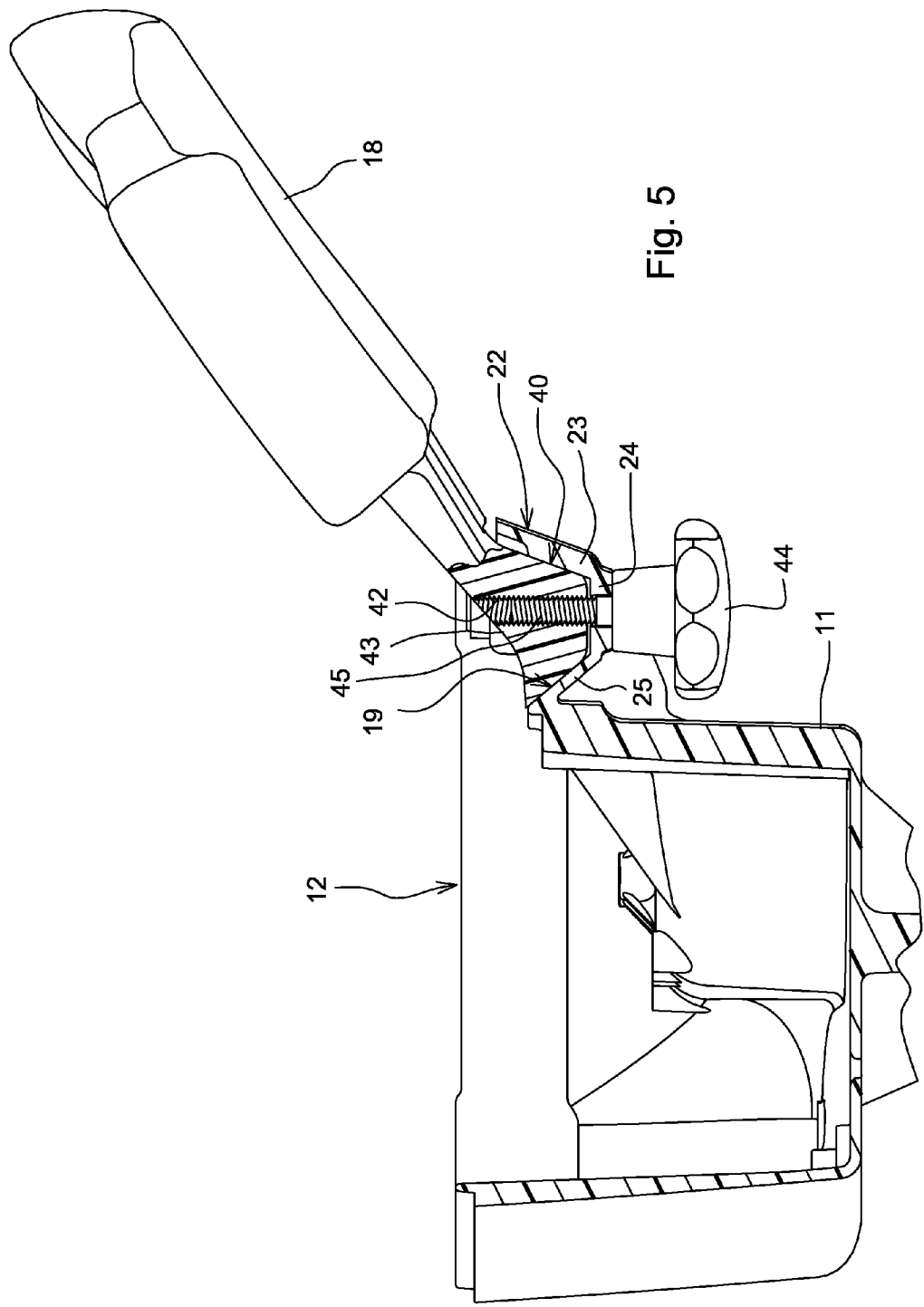
FIG. 5 is a sectional view taken along lines 5-5 of FIG. 4.

As best seen in FIG. 5, the channel member 22 and the attaching member 40 have V or U-shaped cross-sectional shapes so that the attaching member 40 mates or fits snugly into the channel member 22.

With this assembly, auxiliary units, such as the joystick unit 16 and/or the command system module 18, can be quickly and easily be assembled to the base unit 12, and or interchanged with each other.

The U or V shape of the channel 22 allows the CSM 18 to be secured to the base unit 12 by a single screw. With knob 44, this screw can be easily loosened and the CSM 18 can be slid forward or rearward to accommodate different operators in a seat (not shown) and optimize the ergonomic feel and position of the CSM 18.

The joystick unit 14 can easily be installed onto the command arm base unit 12 by inserting the support 32 into the channel 22 and attaching the two screws 46 and 48 from the bottom. No drilling of the channel 22 is required. A joystick wire harness (not shown) may be inserted into the rear of the CSM 18. With this design, the command arm does not need to be disassembled at all. The operator can easily remove the joystick unit 16 when it will not be needed for improved ergonoics for the CSM unit 18.

The unique shape of the channel 22 also allows for other attachments (not shown) to be assembled to the base unit 12, such as additional displays, monitors, or controllers that may be needed by the operator. The advantage of mounting these to the command arm is they are close to the operator and will move when the seat (not shown) is swiveled, so they remain within reach at all times.

The joystick unit 16 is now positioned to the side of the base unit 12 and in a position that all operators can keep their elbows on the soft cushion on top of the base unit 12. It is also in a position that the operator can leave the elbow in one position and pivot the arm between the joystick unit 16 and different control devices on the base unit 12.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle armrest assembly having an armrest base unit and at least one auxiliary unit mounted to the base unit, characterized by:

the base unit having a tub and a cover, the tub and cover forming an opening in a side of the base unit, a side portion of the tub forming a channel member which forms an upwardly opening channel having a bottom wall, a pair of side walls and a pair of end walls, the bottom wall having an elongated slot formed therein, an outer side wall of the tub forming one of the side walls of the channel member; and the auxiliary unit extending through said opening and having an attachment member and a module which projects upwardly and away from the attachment member, the attachment member being received by and coupled to the channel member and positioned above the bottom wall, the attachment member being attached to said bottom surface by a fastener member which extends through the slot so that the attachment member is slidable within the channel member.

2. The armrest assembly of claim 1, wherein:

the fastener member comprises a knob with a threaded shaft, the knob being positioned beneath the channel member, and the shaft extending upwardly through the slot in the bottom wall of the channel member and being threadably received by the attachment member.

3. The armrest assembly of claim 1, wherein:

the attachment and channel members have mating U-shaped cross-sectional shapes.

4. The armrest assembly of claim 2, wherein:

a bore is formed in a bottom surface of the attachment member; and the shaft extends through the bore and the slot.

5. The armrest assembly of claim 1, wherein:

the other side wall of the channel member is inside the tub.

* * * * *